United States Patent
Tanaka et al.

(10) Patent No.: US 11,287,805 B2
(45) Date of Patent: Mar. 29, 2022

(54) SERVO DRIVER AND STATE CHANGE DETECTING METHOD

(71) Applicant: OMRON Corporation, Kyoto (JP)

(72) Inventors: Masahito Tanaka, Otsu (JP); Mamoru Egi, Otsu (JP)

(73) Assignee: OMRON Corporation, Kyoto (JP)

( * ) Notice: Subject to any disclaimer, the term of this patent is extended or adjusted under 35 U.S.C. 154(b) by 246 days.

(21) Appl. No.: 16/645,506

(22) PCT Filed: Oct. 10, 2018

(86) PCT No.: PCT/JP2018/037786
§ 371 (c)(1),
(2) Date: Mar. 9, 2020

(87) PCT Pub. No.: WO2019/082657
PCT Pub. Date: May 2, 2019

(65) Prior Publication Data
US 2020/0278658 A1 Sep. 3, 2020

(30) Foreign Application Priority Data

Oct. 24, 2017 (JP) .............................. JP2017-205224

(51) Int. Cl.
*G05B 19/416* (2006.01)
(52) U.S. Cl.
CPC .................. *G05B 19/416* (2013.01)
(58) Field of Classification Search
CPC ........................... G05B 19/416; H02P 29/024
See application file for complete search history.

(56) References Cited

U.S. PATENT DOCUMENTS

| | | | | |
|---|---|---|---|---|
| 5,602,689 A | * | 2/1997 | Kadlec | ................. G11B 5/5534 360/78.04 |
| 6,034,834 A | * | 3/2000 | Yoshikawa | ............ G11B 21/02 360/75 |

(Continued)

FOREIGN PATENT DOCUMENTS

| | | |
|---|---|---|
| EP | 3139492 A2 | 3/2017 |
| JP | H5-333936 A | 12/1993 |

(Continued)

OTHER PUBLICATIONS

English translation of the International Search Report("ISR") of PCT/JP2018/037786 dated Jan. 15, 2019.

(Continued)

*Primary Examiner* — Rina I Duda
(74) *Attorney, Agent, or Firm* — Metrolex IP Law Group, PLLC (57) ABSTRACT

Provided is a technology of enabling notification, to a user, that the state of a machine system has changed prior to occurrence of machine resonance, irrespective of the direction of a resonance frequency change. This servo driver is provided with: a servo control means for controlling a servo motor in accordance with a time-sequentially inputted command; a calculation means for time-sequentially collecting input data and output data for use in calculation of the frequency response of the servo control means while the servo control means is performing control, in accordance with a command for driving the servo motor itself, based on the command, and calculating a frequency response of the servo control means within a frequency range including a resonance peak, on the basis of the collected data; a specification means for specifying the gain of the resonance peak from the calculated frequency response; and an information output means for comparing the specified gain with a threshold lower than 0 dB, and outputting, when the gain is (Continued)

equal to or greater than the threshold, information for notifying, to a user, that the state of a machine system such as the servo motor has changed.

13 Claims, 8 Drawing Sheets

(56) References Cited

U.S. PATENT DOCUMENTS

| | | | | |
|---|---|---|---|---|
| 6,219,196 | B1* | 4/2001 | Semba | G11B 5/596 318/560 |
| 2010/0001445 | A1* | 1/2010 | Maruyama | F16F 15/0275 267/113 |
| 2011/0069411 | A1* | 3/2011 | Uchida | G11B 19/042 360/77.04 |
| 2013/0214718 | A1 | 8/2013 | Ikeda et al. | |
| 2016/0033959 | A1 | 2/2016 | Iijima et al. | |
| 2016/0048116 | A1* | 2/2016 | Imada | G05B 19/19 318/567 |
| 2017/0264231 | A1 | 9/2017 | Kawanishi et al. | |

FOREIGN PATENT DOCUMENTS

| | | |
|---|---|---|
| JP | 2009-192837 A | 8/2009 |
| JP | 2013-89089 A | 5/2013 |
| JP | 2016-34224 A | 3/2016 |
| JP | 2017-169258 A | 9/2017 |

OTHER PUBLICATIONS

English translation of the Written Opinion("WO") of PCT/JP2018/037786 dated Jan. 15, 2019.

An extended European search report (EESR) dated Jul. 6, 2021 in a counterpart European patent application.

* cited by examiner

SERVO DRIVER AND STATE CHANGE DETECTING METHOD

CROSS REFERENCE TO RELATED APPLICATIONS

This application is based upon and claims the benefit of priority of the prior Japanese Patent Application No. 2017-205224, filed on Oct. 24, 2017, and International Patent Application No. PCT/JP2018/037786, filed on Oct. 10, 2018, the entire contents of which are incorporated herein by reference.

TECHNICAL FIELD

The present invention relates to a servo driver and a state change detecting method.

BACKGROUND ART

A typical servo driver that controls a servo motor is equipped with a notch filter to suppress mechanical resonance. A center frequency of the notch filter preferably matches a resonance frequency, but the resonance frequency changes due to changes over time of a machine. Therefore, a technique has been proposed of calculating a frequency response to detect the resonance frequency by controlling the servo motor on the basis of a velocity command resulting from adding a sine wave disturbance value to an original velocity command, adjusting the notch filter on the basis of the detected resonance frequency, and notifying, when the detected resonance frequency is lower than a reference resonance frequency, a user of the necessity of maintenance of the machine (see Patent Literature 1).

CITATION LIST

Patent Literature

Patent Literature 1: JP 2016-34224 A

SUMMARY OF INVENTION

Technical Problem

The above-described technique makes it possible to detect changes over time of the machine that make the resonance frequency lower. However, the resonance frequency may increase due to the changes over time, and thus the technique may fail to prevent the occurrence of mechanical resonance. Further, when the sine wave disturbance value is added to the velocity command, the machine cannot be controlled as instructed by a host device.

It is therefore an object of the present invention to provide a technique capable of notifying a user of a change in state (deterioration over time) of a mechanical system prior to the occurrence of mechanical resonance, without depending of a direction of a change in resonance frequency and adversely affecting the behavior of a to-be-driven object of a servo motor.

Solution to Problem

In order to achieve the above-described object, according to the present invention, a servo driver that controls a servo motor includes servo control means configured to control the servo motor in accordance with a command input on a time-series basis from an external device, calculation means configured to collect, on a time-series basis, input data and output data for use in calculation of a frequency response of the servo control means while the servo control means is in operation to execute control in accordance with a command for driving the servo motor itself and calculate, on the basis of the data collected, the frequency response of the servo control means within a frequency range containing a resonance peak, identification means configured to identify a gain of the resonance peak from the frequency response calculated by the calculation means, and information output means configured to compare the gain identified by the identification means with a threshold less than 0 dB and output, when the gain is equal to or greater than the threshold, information for use in giving notification, to a user, of a change in state of a mechanical system including the servo motor and a to-be-driven object driven by the servo motor.

That is, the servo driver according to the present invention is configured to identify the gain of the resonance peak from the frequency response of the servo control means and output, when the gain is equal to or greater than the threshold less than 0 dB, information for use in giving notification, to the user, of a change in state of the mechanical system. Mechanical resonance occurs after the gain of the resonance peak (hereinafter, resonance peak gain) becomes equal to or greater than 0 dB, and before becoming equal to or greater than 0 dB, the resonance peak gain becomes equal to or greater than the threshold less than 0 dB. Therefore, with the servo driver according to the present invention, it is possible to notify the user of a change in state (deterioration over time) of the mechanical system prior to the occurrence of mechanical resonance, without depending of a direction of a change in resonance frequency.

Further, the calculation means of the servo driver according to the present invention collects, on a time-series basis, the input data and output data for use in calculation of the frequency response of the servo control means while the servo control means is in operation to execute control in accordance with the command for driving the servo motor itself. Herein, "control in accordance with the command for driving the servo motor itself" is control excluding the following control.

Control in accordance with a command input for calculating the frequency response or automatically setting a control parameter.

Control that is not exactly in accordance with the command input for driving the servo motor itself (control in which a sine wave disturbance value is added to a velocity command, and the like).

Therefore, with the servo driver according to the present invention, it is possible to notify the user of a change in state (deterioration over time) of the mechanical system prior to the occurrence of mechanical resonance, without adversely affecting the behavior the to-be-driven object of the servo motor.

Various calculation means different in specific configuration (function) may be employed in the servo driver according to the present invention. For example, the calculation means may "determine, on the basis of a change pattern of the input data, whether the data collected has reached an amount sufficient for allowing the frequency response to be calculated, bring, when determining that the data collected has reached the amount sufficient for allowing the frequency response within the frequency range containing the resonance peak to be calculated, the collection of data to an end, and calculate the frequency response of the servo control means on the basis of the data collected. Further, as the calculation means, means configured to repeat, for a predetermined period of time (or until a predetermined condition is met), the process of collecting data (input data and output data) and calculating the frequency response on the basis of the data collected until the frequency response within the frequency range containing the resonance peak is calculated may be employed.

In order to prevent a gain of a non-resonant peak (peak that is not the resonance peak) from being identified as the resonance peak gain, as the identification means, means configured to "search the frequency range where the frequency response is calculated by the calculation means and that has a frequency equal to or higher than a velocity proportional gain that is a control parameter of the servo control means set as a lower limit frequency for the resonance peak and identify a gain of the resonance peak found". Further, with this identification means employed, the lower limit frequency may be set to a frequency equal to or higher than a frequency that matches the threshold in a closed-loop transfer function of a velocity feedback loop of the servo control means.

Further, in order to prevent the gain of the non-resonant peak from being identified as the resonance peak gain, the servo driver according to the present invention may employ a configuration where "the servo control means includes a notch filter, and the identification means searches the frequency range where the frequency response is calculated by the calculation means and that contains a center frequency of the notch filter for the resonance peak and identifies a gain of the resonance peak found". With this configuration employed in the servo driver according to the present invention, the frequency range containing the center frequency of the notch filter may be a frequency range of the notch filter determined on the basis of the center frequency, a notch width, and a notch depth of the notch filter, and the threshold, in which a signal is attenuated to be much lower than the threshold.

The input data and output data collected by the calculation means may be any data from which the frequency response can be calculated. Note that the input data and the output data are data for use in determination of the input value and output value of the gain (the ratio between the input value and the output value). However, when the input data is "a current command that is a target value of a current to be applied to the servo motor", it is possible to obtain the frequency response that allows the resonance peak gain to be accurately identified as compared to a case where data (for example, a command input to the servo control means) other than the current command is used. It is therefore preferable that the servo driver according to the present invention employ a configuration where "the servo control means generates, on the basis of the command, a current command that is a target value of a current to be applied to the servo motor to control the servo motor, and the calculation means collects, as the input data, the current command generated by the servo control means". Note that the output data is usually data representing the position or velocity of the motor, but the output data may be any other data as long as the frequency response can be calculated from a combination of the output data and the input data.

Further, the servo driver according to the present invention may employ a configuration where "threshold calculation means configured to calculate the threshold by adding a predetermined value to the gain identified for a first time by the identification means is further included, and the information output means compares each gain identified for a second time and subsequent times by the identification means with the threshold calculated by the threshold calculation means".

To the servo driver according to the present invention, "second information output means configured to calculate a change rate of the gain identified this time by the identification means from the gain identified last time by the identification means and output, when the change rate calculated is equal to or greater than a change rate threshold, information for use in giving notification, to the user, of the change in state of the mechanical system" may be added. Note that the change rate calculated by the second information output means may be information having any unit.

In order to prevent erroneous determination of the state of the mechanical system (make erroneous determination of the state of the mechanical system less likely), the servo driver according to the present invention may employ, as the information output means, means configured to "switch the threshold to be compared with the gain in accordance with a state of the to-be-driven object" or means configured to "switch the threshold to be compared with the gain in accordance with at least one control parameter of the servo controller".

Further, in order to prevent erroneous determination of the state of the mechanical system due to noise, as the identification means, means configured to "identify the gain of the resonance peak from a plurality of frequency responses sequentially calculated by the calculation means" may be employed. Note that an interval between identifications of the gain made by the identification means configured to "identify the gain of the resonance peak from a plurality of frequency responses calculated, on a time-series basis, by the calculation means" may be identical to or longer than an interval between calculations of the frequency response made by the calculation means. Further, an algorithm for identifying the gain of the identification means configured to "identify the gain of the resonance peak from a plurality of frequency responses calculated, on a time-series basis, by the calculation means" may be an algorithm for "calculating a moving average of frequency responses and identifying the gain of the resonance peak from the calculation result" or an algorithm for "removing an abnormal frequency response from a plurality of frequency responses calculated, on a time-series basis, by the calculation means and identifying the gain of the resonance peak from the average of the remaining frequency responses".

Further, according to the present invention, a state change detecting method for detecting a change in state of a mechanical system including a servo motor controlled by a servo driver and a to-be-driven object driven by the servo motor causes a computer to execute a calculation step of collecting, on a time-series basis, input data and output data for use in calculation of a frequency response of the servo driver while the servo driver is in operation to execute control in accordance with the command for driving the servo motor and calculating, on the basis of the data collected, a frequency response of the servo driver within a frequency range containing a resonance peak, an identification step of identifying a gain of the resonance peak from the frequency response calculated in the calculation step, and an information output step of comparing the gain identified in the identification step with a threshold less than 0 dB and outputting, when the gain is equal to or greater than the threshold, information for use in giving notification, to a user, of a change in state of the mechanical system.

Therefore, in the state change detecting method according to the present invention, it is possible to notify the user of a change in state (deterioration over time) of the mechanical system prior to the occurrence of mechanical resonance, without depending of a direction of a change in resonance frequency and adversely affecting the behavior of the to-be-driven object of the servo motor. Note that the "computer" for the state change detecting method according to the present invention may be a computer (control unit) provided inside the servo driver or a computer provided outside the servo driver.

Advantageous Effects of Invention

According to the present invention, it is therefore possible to provide the technique capable of notifying a user of a change in state (deterioration over time) of a mechanical system prior to the occurrence of mechanical resonance, without depending of a direction of a change in resonance frequency and adversely affecting the behavior of the to-be-driven object of the servo motor.

DESCRIPTION OF EMBODIMENTS

Hereinafter, a description will be given of embodiments of the present invention with reference to the drawings.

First Embodiment

Figure 1:
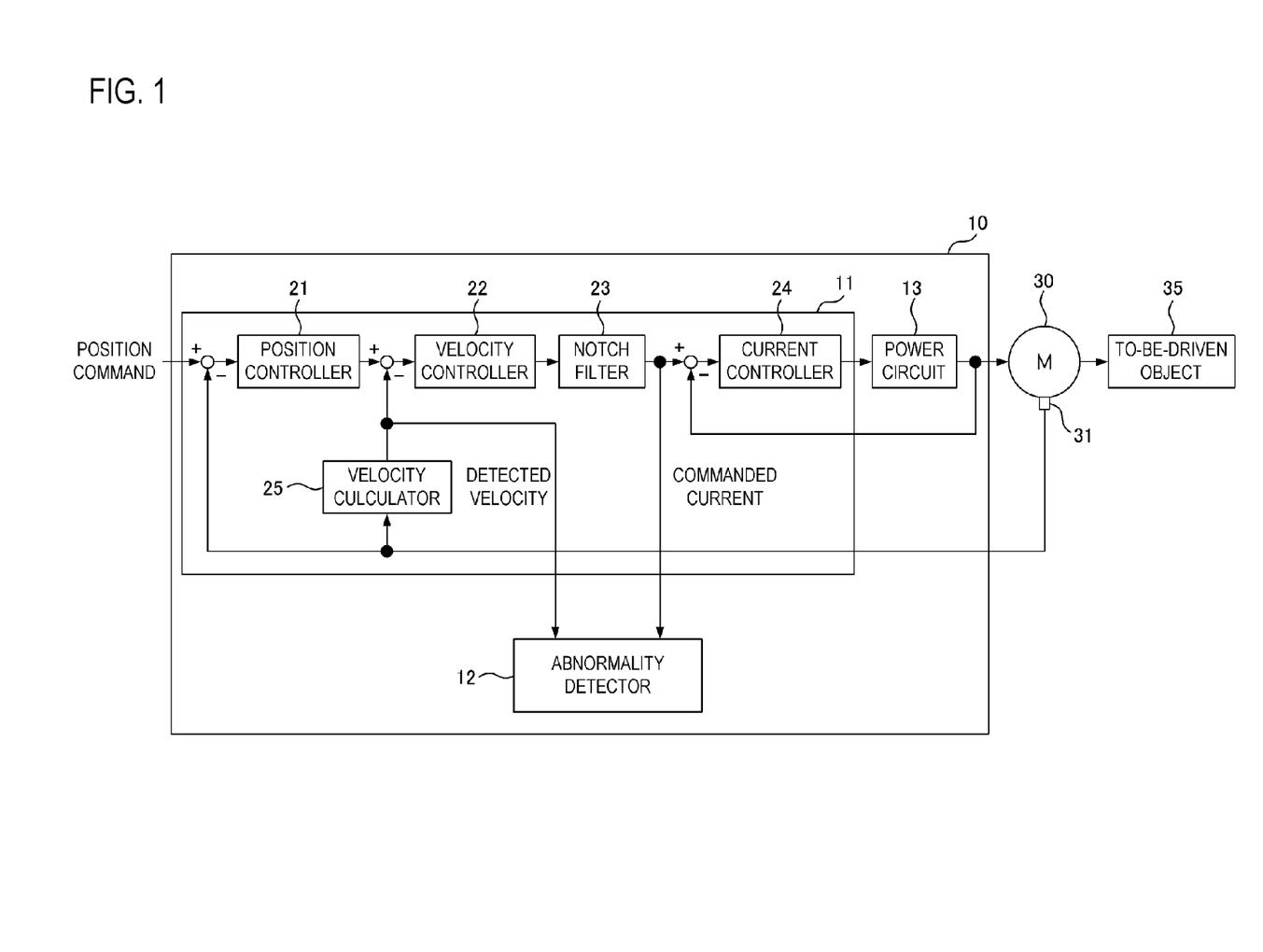
FIG. 1 is a diagram for describing a schematic configuration and use form of a servo driver according to a first embodiment of the present invention.

FIG. 1 shows a schematic configuration and use form of a servo driver 10 according to a first embodiment of the present invention.

The servo driver 10 according to the present embodiment is a device that controls a motor (three-phase motor) 30 for driving a to-be-driven object 35.

As illustrated, the servo driver 10 primarily includes a controller 11, an abnormality detector 12, and a power circuit 13. The power circuit 13 is a circuit that generates a three-phase AC to be supplied to the motor 30. Used as the power circuit 13 is a circuit including, for example, a rectifier circuit for rectifying a three-phase AC from a commercial power supply, a capacitor for smoothing an output voltage of the rectifier circuit, an inverter circuit for converting the output voltage of the rectifier circuit thus smoothed into a three-phase AC voltage, and the like.

The controller 11 is a unit that controls the power circuit 13 to put the motor 30 into operation in accordance with a command (a position command according to the present embodiment) input on a time-series basis from an external device (not shown) such as a programmable logic controller (PLC).

The controller 11 includes a processor, a RAM, a flash ROM, a gate driver, and the like. Further, the flash ROM of the controller 11 stores a program that is loaded onto the RAM and executed by the processor when power is applied to the servo driver 10. The processor executes the program to put the controller 11 into operation as a unit including various functional blocks such as a position controller 21, a velocity controller 22, a notch filter 23, a current controller 24, and a velocity calculator 25.

Each of the functional blocks included in the controller 11 is also included in existing servo drivers. Therefore, no description will be given of details of each of the functional blocks, but the position controller 21 is a unit (functional block) that calculates a velocity command on the basis of a position deviation resulting from subtracting, from the position command, a position detected by a position detector (encoder) 31 (hereinafter, referred to as a detected position) attached to the motor 30. The position controller 21 calculates the velocity command using a preset position proportional gain and the like.

The velocity calculator 25 is a unit that calculates the velocity of the motor 30 from changes over time in the detected position. The velocity controller 22 is a unit that generates a current command on the basis of on a velocity deviation resulting from subtracting the velocity calculated by the velocity calculator 25 (hereinafter, referred to as a detected velocity) from the velocity command calculated by the position controller 21. The position controller 21 calculates the current command using preset control parameters such as a preset velocity proportional gain $k_{vp}$.

The notch filter 23 is a digital filter for attenuating a signal having a frequency in the vicinity of a resonance frequency. For the notch filter 23, a center frequency, a notch depth, and a notch width are set as control parameters. The current controller 24 is a unit that executes feedback control on the power circuit 13 to allow a current to flow through the motor 30 in accordance with the current command after passing through the notch filter 23.

The abnormality detector 12 is a unit that detects, prior to the occurrence of vibrations in a mechanical system (the motor 30 and the to-be-driven object 35) in a system including the servo driver 10, the motor 30, and the to-be-driven object 35, changes over time (deterioration over time) of the mechanical system. The abnormality detector 12 according to the present embodiment is implemented as one of the functions of the controller 11. However, hardware (an electronic circuit primarily including a processor) configured to operate as the abnormality detector 12 may be provided in the servo driver 10 separately from hardware of the controller 11.

Hereinafter, a specific description will be given of the function of the abnormality detector 12. Note that, in the following description, a part including the controller 11 and the power circuit 13 is referred to as a servo controller.

Figure 2:
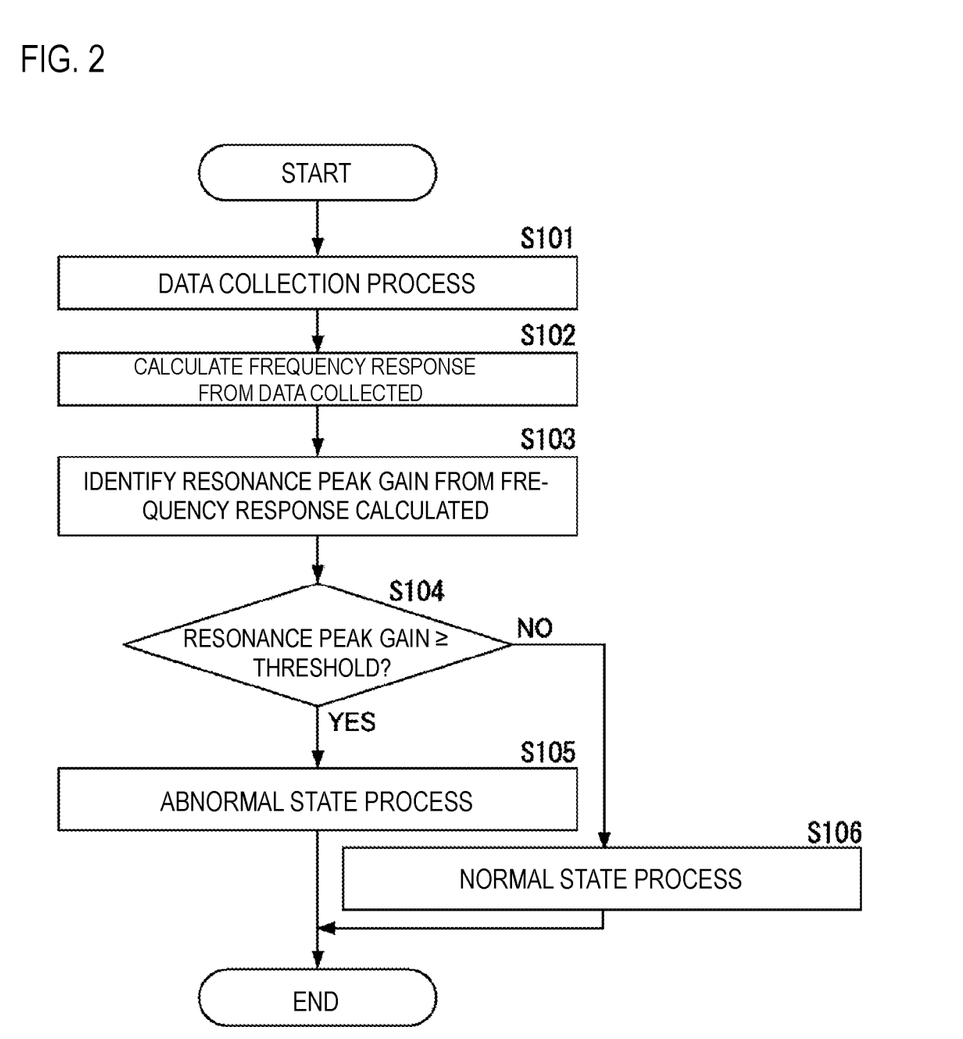
FIG. 2 is a flowchart of a first state determination process to be executed by an abnormality detector in the servo driver according to the first embodiment.

The abnormality detector 12 is a unit that repeatedly executes a first state determination process having a procedure shown in FIG. 2. Note that only when the controller 11 is in operation to control the power circuit 13 for driving the motor 30 itself (control in accordance with a command for driving the motor 30 itself; hereinafter, referred to as normal control), the abnormality detector 12 executes the first state determination process. When the controller 11 is not in operation to execute the normal control (for example, when the controller 11 is in operation to control the power circuit 13 for measuring a frequency response of the servo controller, or when the controller 11 is in operation to execute control for automatically setting the control parameters), the abnormality detector 12 waits, without executing the first state determination process, for the controller 11 to start the normal control.

As illustrated, the abnormality detector 12 that has started the first state determination process first executes a data collection process (step S101).

The data collection process is a process in which a commanded current and detected velocity at each time are stored on a memory provided in the abnormality detector 12 while monitoring the commanded current, and when determination is made, on the basis of the result of monitoring the commanded current, that a predetermined amount of data has been collected, the data collection is brought to an end. Herein, the predetermined amount of data is an amount of data from which a frequency response within a frequency range containing a resonance peak can be calculated.

The data collection process may be a process of collecting data (commanded current and detected velocity) within one continuous time slot or a process of collecting data within a plurality of continuous time slots as long as the data collection process allows the predetermined amount of data to be collected.

When the data collection process is completed, the abnormality detector 12 calculates the frequency response of the servo controller from the data thus collected (step S102). Next, the abnormality detector 12 identifies a resonance peak gain from the frequency response thus calculated (step S103). That is, in step S103, the abnormality detector 12 executes a process of searching the frequency response calculated for the resonance peak and identifying a peak frequency gain of the resonance peak thus found.

The abnormality detector 12 that has completed the identification of the resonance peak gain determines whether the resonance peak gain thus identified is equal to or greater than a threshold $g_{th}$ (step S104). Herein, the threshold $g_{th}$ is a value less than 0 dB (for example, −6 dB) preset in the abnormality detector 12.

Then, when the resonance peak gain is equal to or greater than the threshold $g_{th}$ (step S104; YES), the abnormality detector 12 executes an abnormal state process (step S105). This abnormal state process only needs to be a process of outputting information for use in giving notification, to a user, of a change in state of the mechanical system (that the resonance peak gain has become an abnormal value due to a change in state of the mechanical system). Therefore, the abnormal state process may be a process of outputting a command for turning on/flashing a single-color LED provided on a housing of the servo driver 10 or a process of outputting a command for turning on a multicolor LED provided on the housing of the servo driver 10 in a predetermined color. Further, the abnormal state process may be a process of notifying the user of a change in state of the mechanical system via the external device (that is, a process of transmitting predetermined information to the external device to notify the user of the change in state of the mechanical system).

On the other hand, when the resonance peak gain is less than the threshold $g_{th}$ (step S104; NO), the abnormality detector 12 executes a normal state process (step S106) of notifying the user that the resonance peak gain has not become an abnormal value due to a change in state of the mechanical system. This normal state process only needs to be a process of notifying the user that no gain abnormality has occurred (the resonance peak gain has not become an abnormal value due to a change in state of the mechanical system). Therefore, the normal state process may be a process of outputting a command for turning off the single-color LED or a process of outputting a command for turning on the multicolor LED in a color different from the predetermined color. Further, the normal state process may be a process of notifying the user that no gain abnormality has occurred via the external device or performing no action.

Then, the abnormality detector 12 that has completed the abnormal state process or the normal state process brings the current state determination process to an end and starts the next state determination process.

Figure 3:
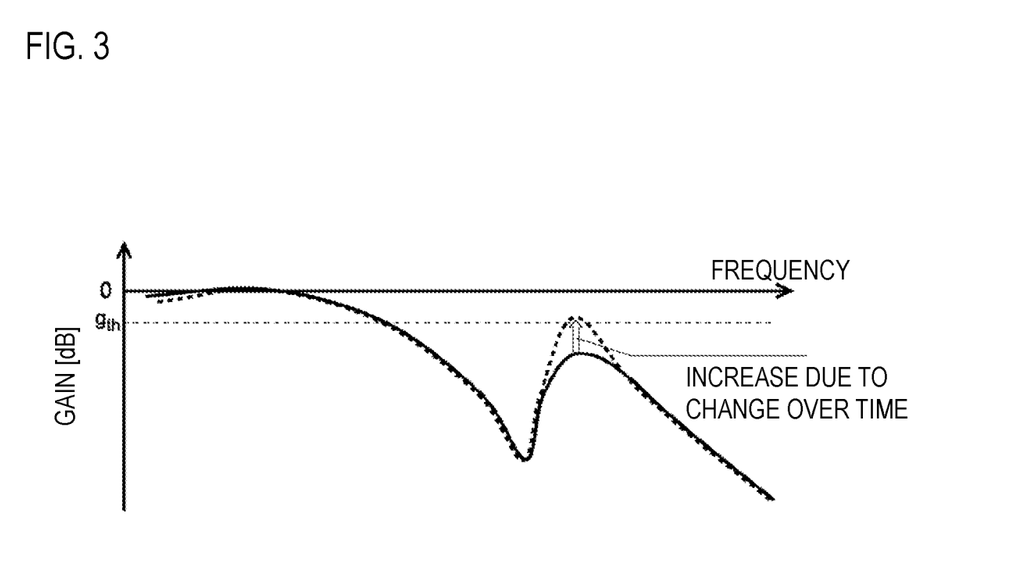
FIG. 3 is a diagram for describing content of the first state determination process.

The abnormality detector 12 operates as described above. Therefore, as shown in FIG. 3, when the resonance peak gain increases to a value equal to or greater than the threshold $g_{th}$ due to changes over time of the mechanical system, the user of the servo driver 10 can become aware of the fact that the resonance peak gain has become an abnormal value due to the changes over time of the mechanical system (it is likely that vibration will occur in the mechanical system after a while). Then, the user who has become aware of the fact that the mechanical system has suffered changes over time (the resonance peak gain has become an abnormal value) performs maintenance on the mechanical system while the servo system is not in operation, allowing the state of the mechanical system to be brought back (or close) to the state prior to the occurrence of the changes over time. Therefore, with the servo driver 10 according to the present embodiment, it is possible to prevent the occurrence of vibrations in the mechanical system during actual operation. Further, the abnormality detector 12 calculates a frequency response on the basis of the current command and the detected velocity while the controller 11 is in operation to execute the normal control. Therefore, with the servo driver 10, it is also possible to notify the user of a change in state of the mechanical system prior to the occurrence of mechanical resonance, without adversely affecting the behavior of the to-be-driven object 35.

Second Embodiment

A servo driver according to a second embodiment of the present invention is a device identical in hardware configuration to the servo driver 10 according to the first embodiment. Therefore, a description will be given below of the servo driver 10 according to the present embodiment using the same reference numerals used in the description of the first embodiment. Further, for convenience of description, the servo driver 10 according to the n-th (=1 to 3) embodiment and the abnormality detector 12 in the servo driver 10 according to the n-th embodiment will be referred below to as the n-th servo driver 10 and the n-th abnormality detector 12, respectively.

Figure 4:
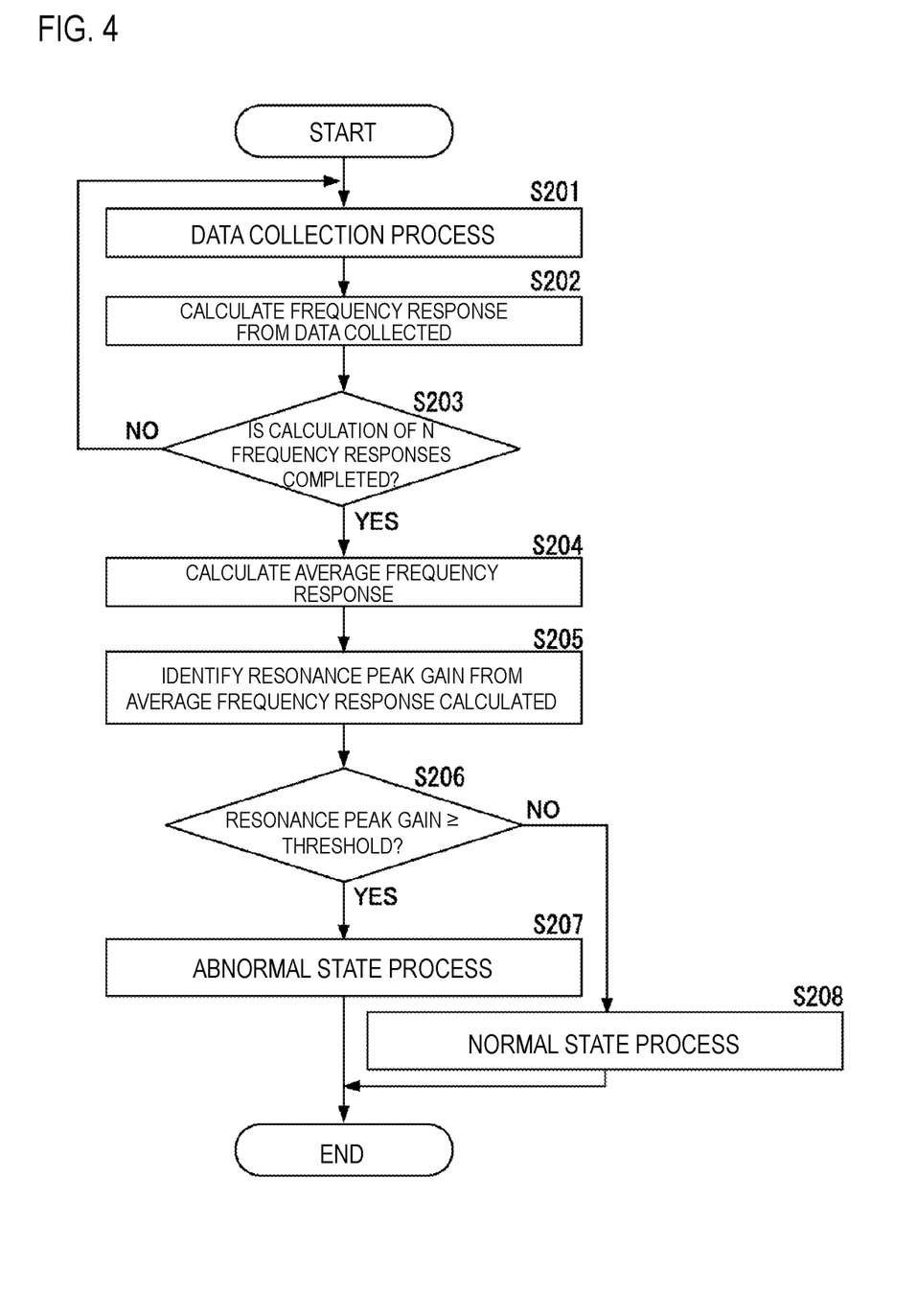
FIG. 4 is a flowchart of a second state determination process to be executed by an abnormality detector in a servo driver according to a second embodiment of the present invention.

The second servo driver 10 (the servo driver 10 according to the second embodiment) is a device including, instead of the first abnormality detector 12 of the first servo driver 10, a second abnormality detector 12 that repeatedly executes a second state determination process having a procedure shown in FIG. 4.

Processes of steps S201 and S202 of the second state determination process are the same as the processes of steps S101 and S102 of the state determination process (FIG. 2).

As described above, the first abnormality detector 12 that is in operation to execute the state determination process executes the process of identifying the resonance peak gain after the process of step S102. On the other hand, the second abnormality detector 12 that is in operation to execute the second state determination process determines whether N frequency responses have been calculated in the current second state determination process after the process of step S202 (step S203). Herein, N is an integer equal to or greater than 2 preset in the second abnormality detector 12.

Then, when the calculation of the N frequency responses has yet to be completed (step S203; NO), the second abnormality detector 12 executes the processes of steps S201 and S202 again to calculate the next frequency response.

When the calculation of the N frequency responses has been completed through such repetitions of processes (step S203; YES), the second abnormality detector 12 averages the N frequency responses to calculate an average frequency response (step S204). Note that averaging the N frequency responses coincides with obtaining an average value of gains of the N frequency responses for each frequency.

Next, the second abnormality detector 12 identifies the resonance peak gain from the average frequency response thus calculated (step S205).

Figure 5:
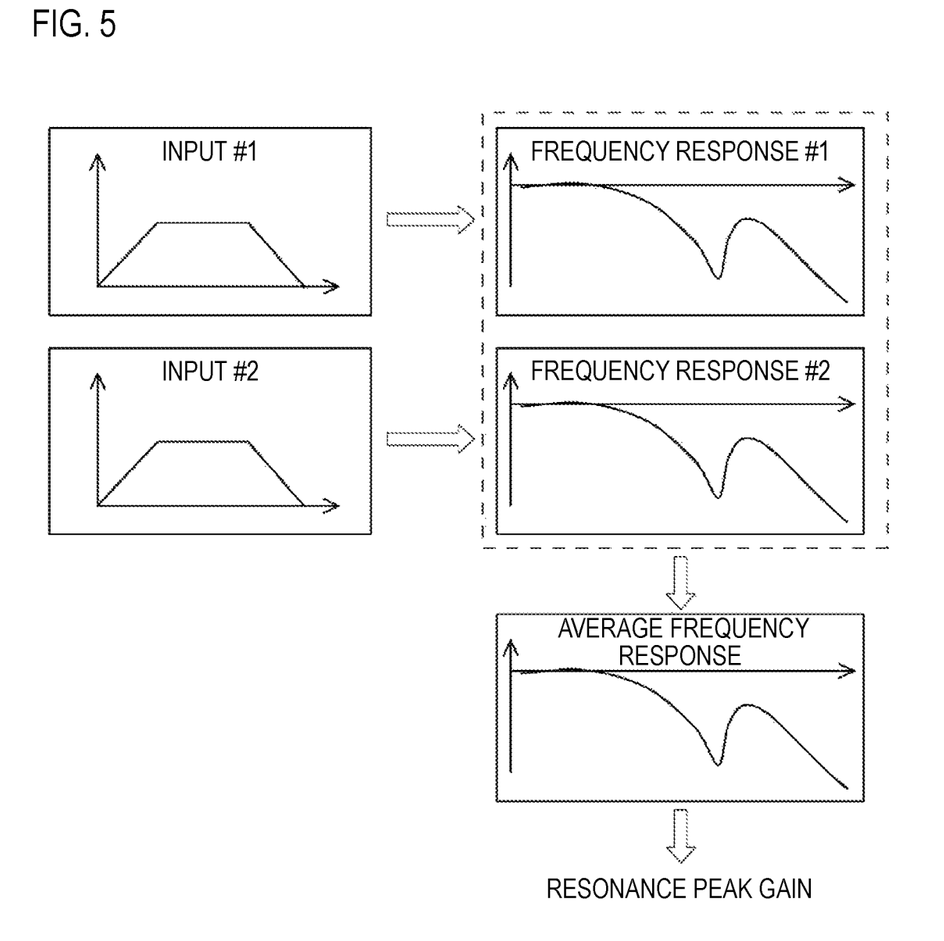
FIG. 5 is a diagram for describing content of the second state determination process.

In short, in steps S201 to S205 of the second state determination process (FIG. 4), as schematically shown in FIG. 5, the average frequency response is calculated on the basis of the result of calculating the plurality of (two in FIG. 5) frequency responses, and the resonance peak gain is identified from the average frequency response thus calculated.

Processes of steps S206 to S208 of the second state determination process are the same as the processes of steps S104 to S106 of the state determination process (FIG. 2), respectively. That is, the second abnormality detector 12 determines whether the resonance peak gain thus identified is equal to or greater than the threshold $g_{th}$ (step S206). Then, the second abnormality detector 12 executes the abnormal state process (step S207) or the normal state process (step S208) on the basis of the determination result.

As described above, as in the first abnormality detector 12, the second abnormality detector 12 identifies the resonance peak gain from the frequency response calculated on the basis of the current command and the detected velocity while the controller 11 is in operation to execute the normal control and notifies, when the resonance peak gain thus identified is equal to or greater than the threshold $g_{th}$, the user of the occurrence of changes over time of the mechanical system. Therefore, as in the servo driver 10 according to the first embodiment, the servo driver 10 according to the present embodiment including the second abnormality detector 12 operates as a device capable of notifying the user of a change in state the mechanical system prior to the occurrence of mechanical resonance, without depending a direction of a change in resonance frequency or adversely affecting the behavior of the to-be-driven object 35.

Further, the second abnormality detector 12 averages the N frequency responses to calculate the average frequency response that is less in amount of superimposed noise and identifies the resonance peak gain from the average frequency response. Therefore, the servo driver 10 according to the present embodiment also operates as a device that makes erroneous determination of the state of the mechanical system due to noise (whether the resonance peak gain is an abnormal value) less likely as compared to the servo driver 10 according to the first embodiment that identifies the resonance peak gain from one frequency response.

Third Embodiment

A servo driver according to a third embodiment of the present invention is a device identical in hardware configuration to the servo driver 10 according to the first embodiment. Therefore, a description will be given below of the servo driver 10 according to the present embodiment using the same reference numerals used in the description of the first embodiment.

Figure 6:
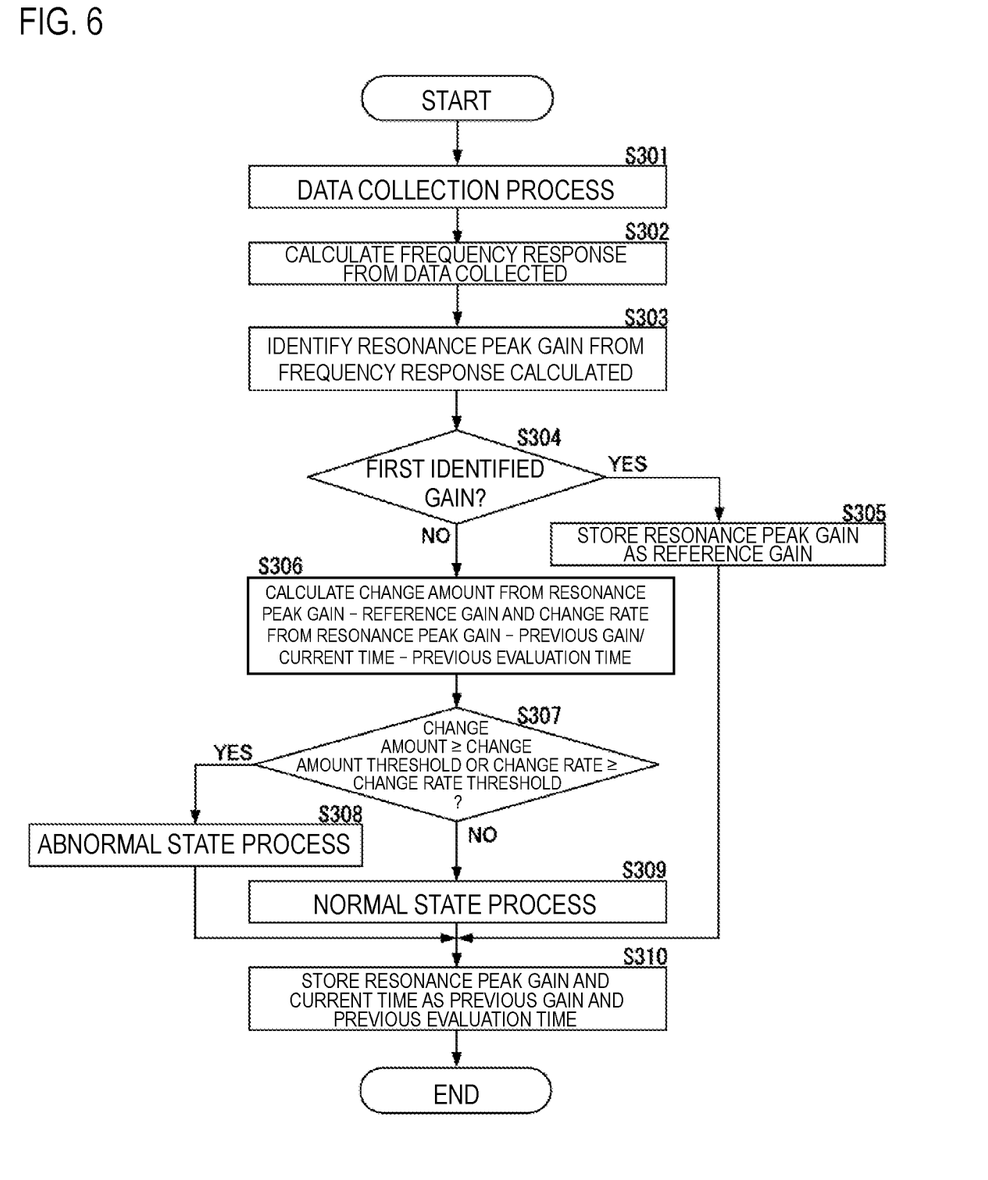
FIG. 6 is a flowchart of a third state determination process to be executed by an abnormality detector in a servo driver according to a third embodiment of the present invention.

The third servo driver 10 is a device including, instead of the first abnormality detector 12 of the first servo driver 10, a third abnormality detector 12 that repeatedly executes a third state determination process having a procedure shown in FIG. 6.

Processes of steps S301 to S303 of the third state determination process are the same as the processes of steps S101 to S103 of the state determination process (FIG. 2).

As described above, the first abnormality detector 12 that is in operation to execute the state determination process determines, after the process of step S103, whether the resonance peak gain is equal to or greater than the threshold $g_{th}$. On the other hand, as illustrated, the third abnormality detector 12 that is in operation to execute the third state determination process determines, after the process of step S303, whether the resonance peak gain identified in the process is a gain identified for a first time (hereinafter, referred to as a first identified gain) (step S304).

When the resonance peak gain identified this time is the first identified gain (step S304; YES), the third abnormality detector 12 stores the resonance peak gain as a reference gain therein (on a memory provided in the third abnormality detector 12) (step S305). Next, the third abnormality detector 12 stores, therein, the resonance peak gain identified this time and the current time as a previous gain and a previous evaluation time, respectively (step S310). Then, the third abnormality detector 12 brings the current state determination process to an end and starts the next state determination process.

On the other hand, when the resonance peak gain identified this time is not the first identified gain (step S304; NO), the third abnormality detector 12 starts the process of step S306 and the subsequent processes. Then, in step S306, the third abnormality detector 12 first calculates an amount of change in the resonance peak gain identified this time from the reference gain by subtracting the reference gain from the resonance peak gain identified this time. In step S306, the third abnormality detector 12 further calculates a change rate of the resonance peak gain identified this time from the resonance peak gain identified last time. Note that, at this time, the unit of the change rate thus calculated is not limited to a specific unit. For example, as shown in FIG. 6, the change rate may be "(resonance peak gain−previous gain)/ (current time−previous evaluation time)", that is, an amount of change in peak gain per real time (second, millisecond, or the like). Further, the change rate may be a value resulting from dividing the amount of change in peak gain by an amount of change in counter value (a value to be incremented as time progresses) such as an energization time counter from the previous evaluation time.

Subsequently, the third abnormality detector 12 determines whether at least one of a first condition where the amount of change thus calculated is equal to or greater than a change amount threshold and a second condition where the change rate thus calculated is equal to or greater than a change rate threshold is satisfied (step S307). Herein, the change rate threshold is a value that is preset in the third abnormality detector 12 as a lower limit value of the change rate of the resonance peak gain and is used for determining that the resonance peak gain has become an abnormal value. Further, the change amount threshold is a value that is preset in the third abnormality detector 12 as a lower limit value of the amount of change in resonance peak gain from the reference gain and is used for determining that the resonance peak gain has become an abnormal value. Note that the change amount threshold is defined such that the reference gain+the change amount threshold<0 dB is satisfied on condition that the reference gain is not an abnormal value.

When both or either one of the first and second conditions is satisfied (step S307; YES), the third abnormality detector 12 executes the above-described abnormal state process in step S308. Further, when neither of the first and second conditions is satisfied (step S307; NO), the third abnormality detector 12 executes the above-described normal state process in step S309. The third abnormality detector 12 that has completed the abnormal state process or the normal state process stores, therein, the resonance peak gain identified this time and the current time as the previous gain and the previous evaluation time, respectively (step S310). Then, the third abnormality detector 12 brings the current third state determination process to an end and then starts the next third state determination process.

As is apparent from the above description, when the resonance peak gain increases to "reference gain+change amount threshold" (<0 dB) due to changes over time of the mechanical system, the user of the third servo driver 10 is notified that the mechanical system has suffered the changes over time. That is, as schematically shown in FIG. 7, when the resonance peak gain identified is $g_{c1}$ equal to or greater than the threshold that matches "reference gain+change amount threshold", the user is notified that the mechanical system has suffered the changes over time.

By the way, a problem that the resonance peak gain changes suddenly in a short period of time may arise in the mechanical system, and when such a problem arises in the mechanical system, only the above-described notification function may cause the mechanical system to vibrate before the user is notified that the mechanical system has suffered the changes over time. However, as described above, even when the change rate of the resonance peak gain is equal to or greater than the change rate threshold, the third abnormality detector 12 of the third servo driver 10 notifies the user that the mechanical system has suffered the changes over time.

Figure 7:
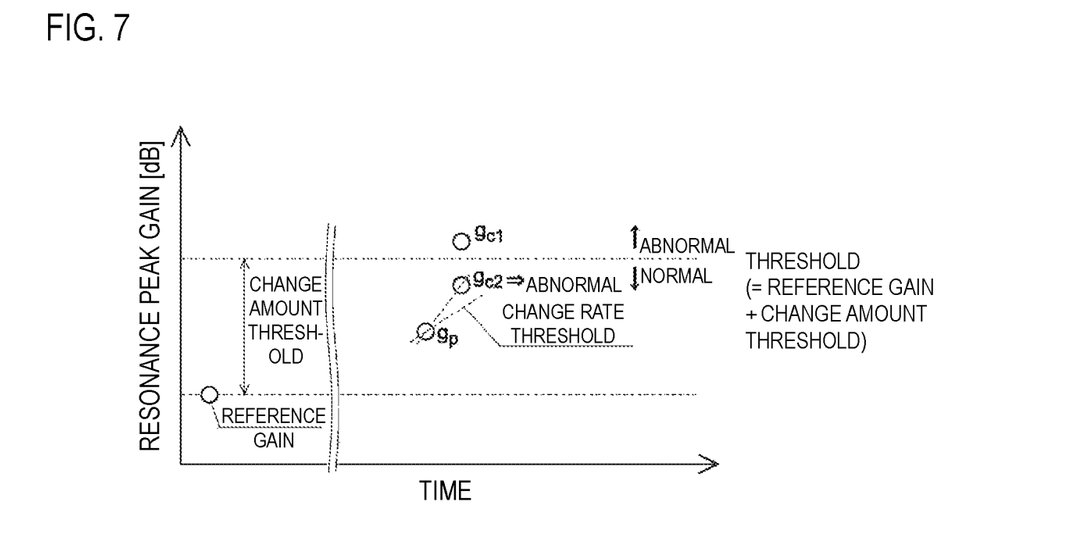
FIG. 7 is a diagram for describing content of the third state determination process.

That is, as schematically shown in FIG. 7, when a change rate of a resonance peak gain $g_{c2}$ identified from the resonance peak gain $g_p$ identified last time is equal to or greater than the change rate threshold even if the $g_{c2}$ is less than the threshold, the user of the third servo driver 10 is notified that the resonance peak gain has become an abnormal value due to the changes over time of the mechanical system. Therefore, even when the above-described problem arises in the mechanical system, the third servo driver 10 can notify, prior to the occurrence of vibrations in the mechanical system, the user that the mechanical system is likely to vibrate.

Hereinafter, some additional points will be provided for each of the above-described embodiments.

The process of steps S103, S205, and S303 of the first to third state determination processes (hereinafter, referred to as a gain identification process) may be a process of searching all the frequency responses (including the average frequency response) of the servo controller for the resonance peak and identifying the peak frequency gain of the resonance peak thus found. However, in the gain identification process of searching all the calculated frequency responses for the resonance peak, a non-resonance peak (a peak that is not the resonance peak) may be found as the resonance peak, and a gain of the non-resonance peak thus found may be identified as the resonance peak. In order to prevent such an erroneous search (erroneous identification) from being made, the gain identification process may be a process of restricting a resonance peak detection range (search range).

Various methods for restricting the resonance peak detection range may be employed. For example, the peak frequency of the resonance peak is higher than the velocity proportional gain $k_{vp}$. Therefore, frequency responses on a frequency side higher than the velocity proportional gain $k_{vp}$ may be searched for the resonance peak.

Further, the frequency response of the servo controller has a shape as shown in FIG. 3, that is, a frequency at which the gain matches the threshold $g_{th}$ exists on a low-frequency side, but the resonance frequency (the peak frequency of the resonance peak) is higher than a frequency $f_0$ on the low-frequency side at which the gain matches the threshold $g_{th}$. The frequency $f_0$ can be approximated by the following value from a closed-loop transfer function of a velocity feedback loop of the servo controller.

$$f_0 = ak_{vp} \qquad \text{[Math. 1]}$$
$$a = 10^{\frac{-g_{th}}{20}}$$

Figure 8:
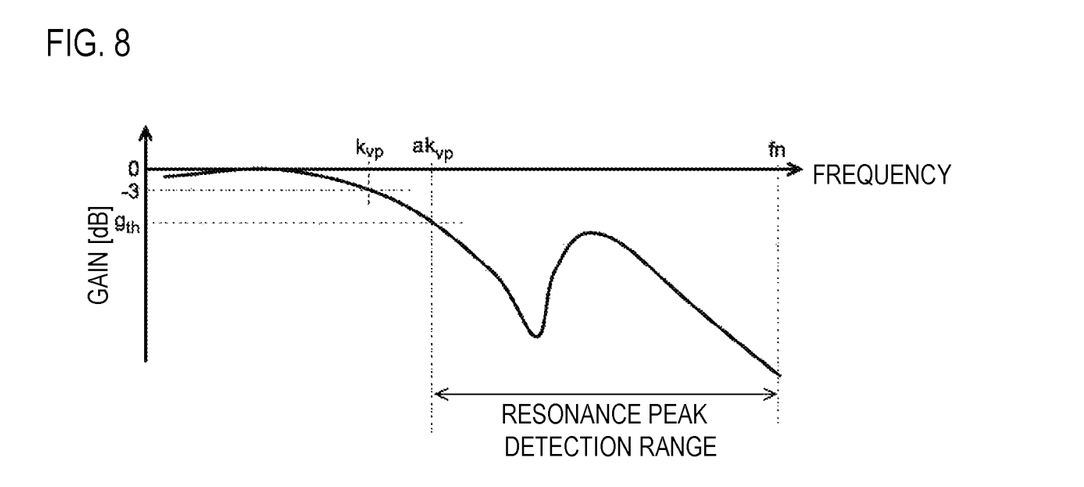
FIG. 8 is a diagram for describing a method for restricting a resonance peak detection range.

Therefore, as shown in FIG. 8, frequency responses within a frequency range from $ak_{vp}$ to a frequency sufficiently higher than the resonance frequency such as a Nyquist frequency fn (one half of the inverse of a data collection rate of the abnormality detector 12) may be searched for the resonance peak.

Further, the center frequency of the notch filter 23 is usually adjusted to a value in the vicinity of the resonance frequency. Therefore, the resonance peak detection range may be a frequency range containing the center frequency of the notch filter 23, for example, a frequency range within the notch width.

Figure 9:
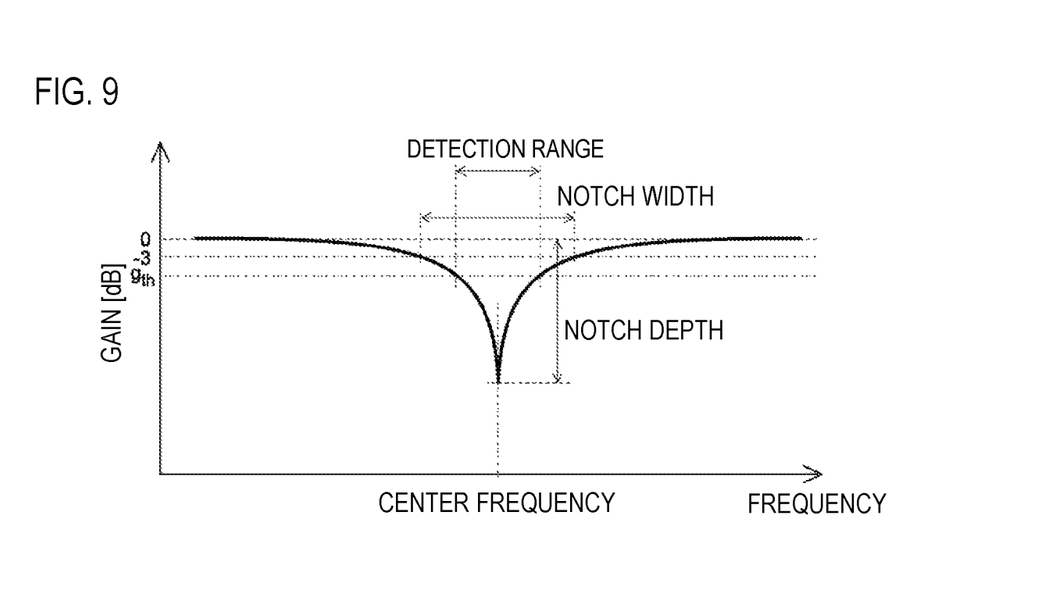
FIG. 9 is a diagram for describing a method for restricting a resonance peak detection range.

Further, from a transfer function G(s) of the notch filter 23 shown below, two frequencies at which an attenuation rate matches the threshold $g_{th}$ are obtained, and as shown in FIG. 9, a range between the frequencies may serve as the resonance peak detection range.

$$G(s) = \frac{s^2 + R\frac{\omega_a}{Q}s + \omega_a^2}{s^2 + \frac{\omega_a}{Q}s + \omega_a^2} \qquad \text{[Math. 2]}$$

Note that R, ωa, and Q in the transfer function G(s) denote values having the following relationship with a center frequency fc [Hz], a notch depth d [dB], and a notch width w [Hz] of the notch filter 23.

$$R = \log^{-\frac{d}{20}}$$
$$\omega_a = 2\pi f_c$$
$$Q = f_c / w$$

[Math. 3]

Further, in order to make erroneous determination of the state of the mechanical system less likely, the determination process of step S104 of the first state determination process and the determination process of step S206 of the second state determination process may be a process of switching the threshold $g_{th}$ to be compared with the resonance peak gain in accordance with a condition of the servo system at the point of time (hereinafter, referred to as a threshold switching determination process). Note that the condition of the servo system at the point of time refers to a rotation direction of the motor 30, a control state of the controller 11 identified on the basis of some control parameters, inertia of the to-be-driven object 35, and the like.

Figure 10A:
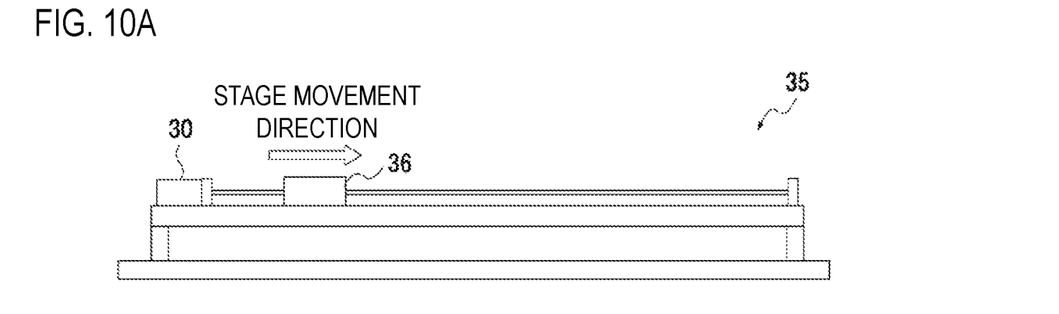
FIG. 10A is a diagram (part 1) for describing a servo system in which a resonance peak gain changes depending on a motor rotation direction.
Figure 10B:
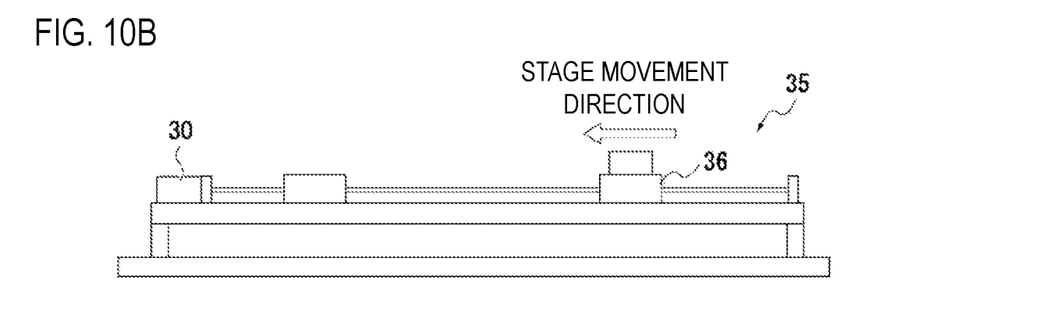
FIG. 10B is a diagram (part 2) for describing the servo system in which the resonance peak gain changes depending on the motor rotation direction.

Specifically, as shown in FIGS. 10A and 10B, a configuration where the to-be-driven object 35 driven by the motor 30 is a stage movement mechanism that has nothing placed on a stage 36 on an outward path (FIG. 10A) and has an object placed on the stage 36 on a return path (FIG. 10B) will be considered. In this configuration, the inertia of the to-be-driven object 35 changes depending on the rotation direction of the motor 30. That is, the resonance peak gain changes depending on the rotation direction of the motor 30.

Therefore, when the to-be-driven object 35 serves as the stage movement mechanism as shown in FIGS. 10A and 10B and the threshold $g_{th}$ is made constant, it is likely to lead to erroneous determination that the resonance peak gain is an abnormal (or normal) value even if the resonance peak gain is actually a normal (or abnormal) value. Further, even when the control parameters of the controller 11 (such as the velocity proportional gain $k_{vp}$) are changed and the inertia of the to-be-driven object 35 changes accordingly, it is likely to lead to similar erroneous determination because the resonance peak gain changes.

On the other hand, with the determination process of step S104 or S206 serving as the threshold switching determination process of switching the threshold $g_{th}$ to be compared with the resonance peak gain in accordance with the condition of the servo system at the point of time, for example, when the stage 36 moves in a first direction, it is possible to make the comparison between the resonance peak gain and a threshold for movement in the first direction, and when the stage 36 moves in a second direction opposite to the first direction, it is possible to make the comparison between the resonance peak gain and a threshold for movement in the second direction. It is also possible that when the controller 11 is in operation to execute a first control under which the resonance peak gain is made relatively low (when a control parameter group that makes the resonance peak gain relatively low is set in the controller 11 or the like), a first threshold is used, when the controller 11 is in operation to execute a second control under which the resonance peak gain is made higher, a second threshold greater than the first threshold is used, and when the controller 11 is in operation to execute a third control under which the resonance peak gain is made further higher, a third threshold greater than the second threshold is used.

Therefore, with the determination process of step S104 or S206 serving as the threshold switching determination process, it is possible to obtain the servo driver 10 that makes erroneous determination of the state of the mechanical system less likely.

The third abnormality detector 12 may be modified into a unit that executes the third state determination process for each condition of the servo system. Specifically, for example, with the to-be-driven object 35 serving as the stage movement mechanism as shown in FIGS. 10A and 10B, the third abnormality detector 12 may be modified into a unit that executes, when the motor 30 rotates in the first direction, the third state determination process for the first direction, and executes, when motor 30 rotates in the second direction reverse to the first direction, the third state determination process for the second direction. Further, with the controller 11 configured to execute the first control under which the resonance peak gain is made relatively low, the second control under which the resonance peak gain is made higher, and the third control under which the resonance peak gain is made further higher, the third abnormality detector 12 may be modified into a unit that executes the third state determination process for the first control while the controller 11 is in operation to execute the first control, executes the third state determination process for the second control while the controller 11 is in operation to execute the second control, and executes the third state determination process for the third control while the controller 11 is in operation to execute the third control. With the third abnormality detector 12 modified into such a unit, a different reference gain will be used in accordance with the condition of the servo system, and it is therefore possible to make erroneous determination of the state of the mechanical system less likely.

Each of the above-described abnormality detectors 12 is a unit that collects the current command and the detected velocity (the rotation velocity of the motor 30) in order to calculate the frequency response, but the input data and output data to be collected in order to calculate the frequency response may be any data from which the frequency response can be calculated. However, as described above, when the input data is the current command, it is possible to obtain the frequency response that allows the resonance peak gain to be accurately identified as compared to a case where data (for example, the position command input to the servo driver 10) other than the current command is used. Therefore, it is preferable that the input data be the current command. Further, the output data is usually data representing the position or velocity of the motor 30, but the output data may be any other data as long as the frequency response can be calculated from a combination of the output data and the input data. Note that the input data and the output data are data for use in determination of the input value and output value of the gain (the ratio between the input value and the output value).

Further, instead of the processes of steps S101 and S102 of the first state determination process, the processes of steps S201 and S202 of the second state determination process, and the processes of steps S301 and S302 of the third state determination process, "a process of repeating the process of collecting data and calculating the frequency response on the basis of the data collected until the frequency response in the frequency range containing the resonance peak is calculated" may be employed.

The second state determination process (FIG. 4) may be modified into a process of removing an abnormal frequency response from N frequency responses by Thompson's rejection test and identifying the resonance peak gain from the average of the remaining frequency responses. Further, the second state determination process may be modified into a process of calculating a moving average of N frequency responses and identifying the resonance peak gain from the calculation result. Further, the third state determination process (FIG. 6) may be modified into a process of identifying the resonance peak gain from the average of a plurality of frequency responses.

REFERENCE SIGNS LIST 10 servo driver
11 controller
12 abnormality detector
13 power circuit
21 position controller
22 velocity controller
23 notch filter
24 current controller
25 velocity calculator
30 motor
31 position detector
35 to-be-driven object
36 stage

The invention claimed is:

1. A servo driver that controls a servo motor, comprising: servo control unit configured to control the servo motor in accordance with a command input on a time-series basis from an external device;
calculation unit configured to collect, on a time-series basis, input data and output data for use in calculation of a frequency response of the servo control unit while the servo control unit is in operation to execute control in accordance with a command for driving the servo motor itself and calculate, on the basis of the data collected, the frequency response of the servo control unit within a frequency range containing a resonance peak;
identification unit configured to identify a gain of the resonance peak from the frequency response calculated by the calculation unit; and
information output unit configured to compare the gain identified by the identification unit with a threshold less than 0 dB and output, when the gain is equal to or greater than the threshold, information for use in giving notification, to a user, of a change in state of a mechanical system including the servo motor and a to-be-driven object driven by the servo motor.

2. The servo driver according to claim 1, wherein the identification unit searches the frequency range where the frequency response is calculated by the calculation unit and that has a frequency equal to or higher than a velocity proportional gain that is a control parameter of the servo control unit set as a lower limit frequency for the resonance peak and identifies a gain of the resonance peak found.

3. The servo driver according to claim 2, wherein the lower limit frequency is a frequency equal to or higher than a frequency that matches the threshold in a closed-loop transfer function of a velocity feedback loop of the servo control unit.

4. The servo driver according to any one of claims 1 to 3, wherein
the servo control unit includes a notch filter, and
the identification unit searches the frequency range where the frequency response is calculated by the calculation unit and that contains a center frequency of the notch filter for the resonance peak and identifies a gain of the resonance peak found.

5. The servo driver according to claim 4, wherein the frequency range is a frequency range of the notch filter determined on the basis of the center frequency, a notch width, and a notch depth of the notch filter, and the threshold, in which a signal is attenuated to be much lower than the threshold.

6. The servo driver according to any one of claims 1 to 3, wherein
the servo control unit generates, on the basis of the command, a current command that is a target value of a current to be applied to the servo motor to control the servo motor, and
the calculation unit collects, as the input data, the current command generated by the servo control unit.

7. The servo driver according to any one of claims 1 to 3, wherein the calculation unit determines, on the basis of a change pattern of the input data, whether the data collected has reached an amount sufficient for allowing the frequency response to be calculated, brings, when determining that the data collected has reached the amount sufficient for allowing the frequency response within the frequency range containing the resonance peak to be calculated, the collection of data to an end, and calculates the frequency response of the servo control unit on the basis of the data collected.

8. The servo driver according to any one of claims 1 to 3, further comprising threshold calculation unit configured to calculate the threshold by adding a predetermined value to the gain identified for a first time by the identification unit,
wherein the information output unit compares each gain identified for a second time and subsequent times by the identification unit with the threshold calculated by the threshold calculation unit.

9. The servo driver according to any one of claims 1 to 3, further comprising second information output unit configured to calculate a change rate of the gain identified this time by the identification unit from the gain identified last time by the identification unit and output, when the change rate calculated is equal to or greater than a change rate threshold, information for use in giving notification, to the user, of the change in state of the mechanical system.

10. The servo driver according to any one of claims 1 to 3, wherein the information output unit switches the threshold to be compared with the gain in accordance with a state of the to-be-driven object.

11. The servo driver according to any one of claims 1 to 3, wherein the information output unit switches the threshold to be compared with the gain in accordance with at least one control parameter of the servo control unit.

12. The servo driver according to any one of claims 1 to 3, wherein the identification unit identifies the gain of the resonance peak from a plurality of frequency responses calculated, on a time-series basis, by the calculation unit.

13. A state change detecting method for detecting a change in state of a mechanical system including a servo motor controlled by a servo driver and a to-be-driven object driven by the servo motor, the method causing a computer to execute:
a calculation step of collecting, on a time-series basis, input data and output data for use in calculation of a frequency response of the servo driver while a command for driving the servo motor itself keeps being input to the servo driver and calculating, on the basis of the data collected, a frequency response of the servo driver within a frequency range containing a resonance peak;

an identification step of identifying a gain of the resonance peak from the frequency response calculated in the calculation step; and an information output step of comparing the gain identified in the identification step with a threshold less than 0 dB and outputting, when the gain is equal to or greater than the threshold, information for use in giving notification, to a user, of a change in state of the mechanical system.

* * * * *